United States Patent [19]

Matthews

[11] Patent Number: 5,712,427
[45] Date of Patent: Jan. 27, 1998

[54] VIBRATORY ROTATION SENSOR WITH SCANNING-TUNNELING-TRANSDUCER READOUT

[75] Inventor: Anthony Matthews, Santa Barbara, Calif.

[73] Assignee: Litton Systems Inc., Woodland Hills, Calif.

[21] Appl. No.: 822,049

[22] Filed: Mar. 24, 1997

Related U.S. Application Data

[63] Continuation-in-part of Ser. No. 520,452, Aug. 29, 1995, abandoned.

[51] Int. Cl.$^6$ .................................................. G01P 9/04
[52] U.S. Cl. .................................. 73/504.04; 73/504.13; 73/1.37
[58] Field of Search .................. 73/504.04, 504.13, 73/504.12, 504.14, 504.15, 504.16, 1.37, 1.38, 1.75, 1.77, 1.78

[56] References Cited

U.S. PATENT DOCUMENTS

| | | | |
|---|---|---|---|
| 4,951,508 | 8/1990 | Loper, Jr. et al. | 73/505 |
| 5,218,867 | 6/1993 | Varnham et al. | 73/514.29 |
| 5,285,686 | 2/1994 | Peters | 73/504.15 |

OTHER PUBLICATIONS

T.W. Kenny et al., "Micromachined Tunneling Accelerometer", *NASA Tech. Brief*, vol. 17, No. 11, Item #61, Nov. 1993, pp. i, 1–4, 1a–3a.

T.W. Kenny et al., "Techniques for Mass Production of Tunneling Electrodes", *NASA Tech. Brief*, vol. 17, No. 11, Item #1, Nov. 1993, pp. i –i i, 1–3.

S.E. McBride et al., "Scanning–Tunneling–Microscope Detection of Surface Acoustic Waves", *Proceedings of the 1992 IEEE Ultrasonics Symposium*, (1992), pp.445–448.

*Primary Examiner*—John E. Chapman
*Attorney, Agent, or Firm*—Robert E. Malm

[57] ABSTRACT

A vibratory rotation sensor that utilizes non-capacitive mechanical displacement detectors (24) to detect the flexural standing wave pattern in a hemispherical resonator (14). In a preferred embodiment, a plurality of tunneling transducers (24) are positioned around the hemispherical resonator (14) to detect the standing wave. A "force-to-rebalance" mechanization mode is preferably used for calculating the sensor's rate of rotation, with a transducer (24) placement that allows for constant calibration of the sensor's scale factor. In addition, a pickoff transducer orientation is provided that allows for simultaneous calculation of the sensor's rotation angle and any linear acceleration that is exerted on the sensor's hemispherical resonator (14), thereby allowing the sensor to be simultaneously used as a rotation sensor and an accelerometer.

8 Claims, 11 Drawing Sheets

→ Velocity
⇒ FORCE

LOGIC CONTROL; PHASE LOCKED LOOP

FORCE-TO-REBALANCE CONTROL

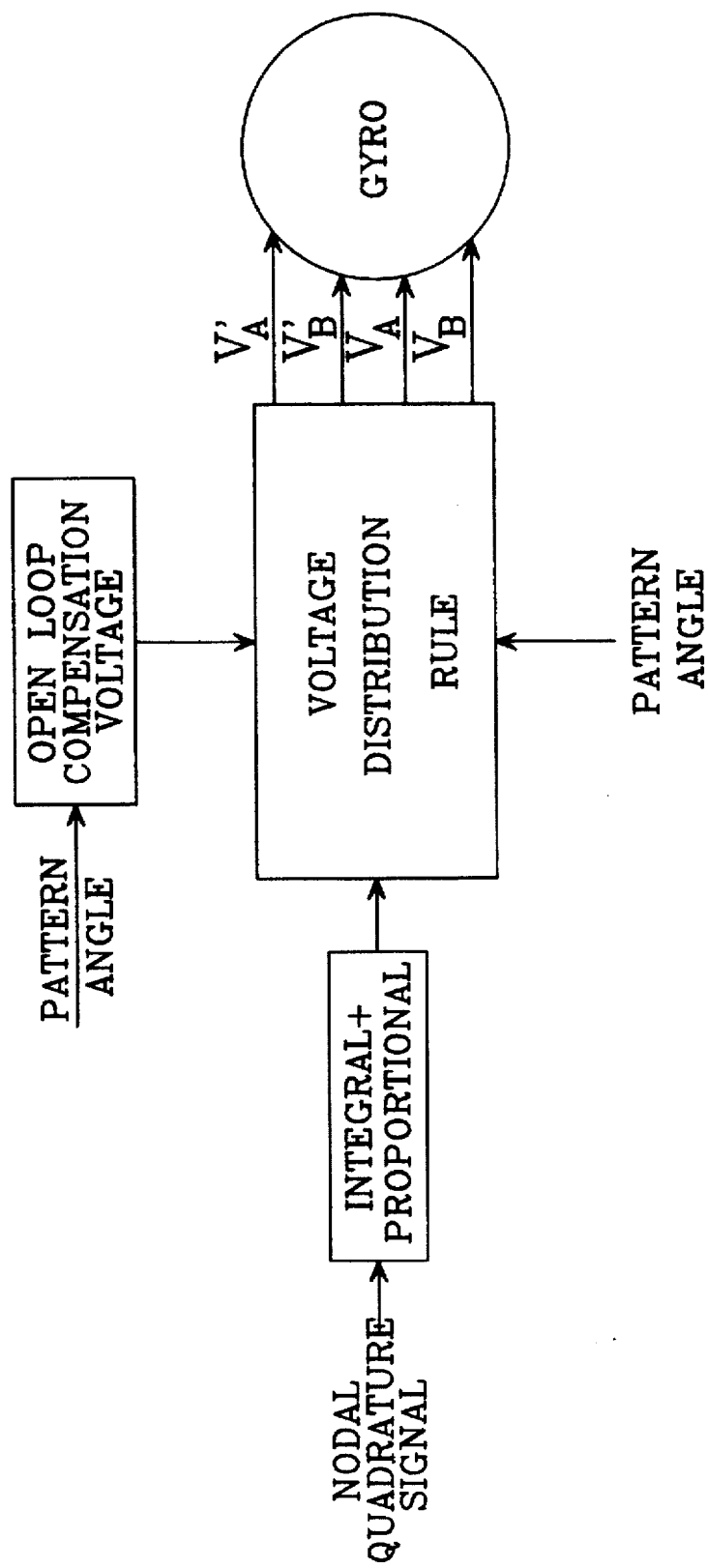
FIG. 10e RESONATOR QUADRATURE CONTROL

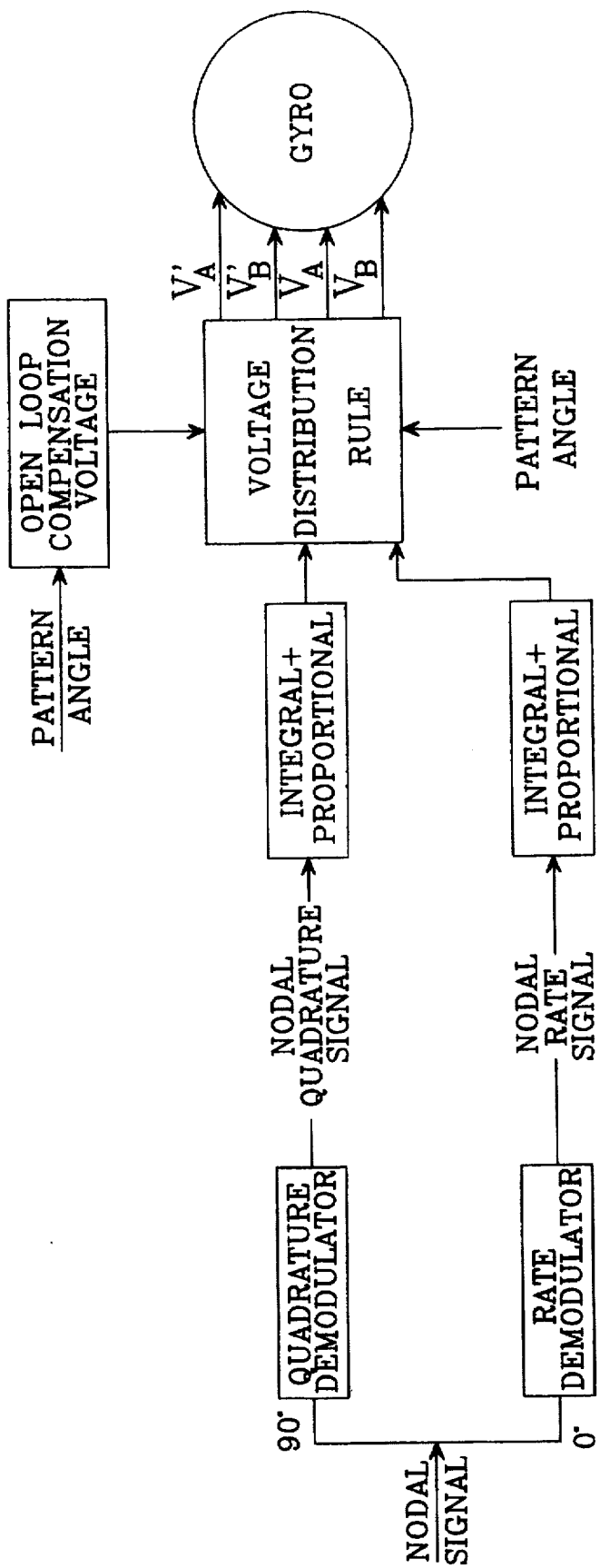
FIG. 10f  RESONATOR QUADRATURE CONTROL (Force-To-Rebalance Mode)

VIBRATORY ROTATION SENSOR WITH SCANNING-TUNNELING-TRANSDUCER READOUT

This application is a continuation-in-part of application Ser. No. 08/520,452 filed Nov. 08/520,452, filed Aug. 29, 1995, now abandoned.

BACKGROUND OF THE INVENTION

1. Field of the Invention

This invention relates to rotation sensors and more specifically to a rotation sensor of the "vibrating bell" type referred to as a sonic gyroscope (gyro).

2. Description of the Related Art

A sonic gyro is disclosed in U.S. Pat. No. 4,951,508, entitled "VIBRATORY ROTATION SENSOR", issued Aug. 28, 1990 to Edward J. Loper, Jr., et. al. This gyro consists of three principal fused quartz parts that are joined together with indium and enclosed in a metal housing. The three parts comprise a forcer, a hemispherical resonator, and a pickoff.

The forcer is typically implemented with a capacitive ring electrode, and is used to initiate a flexural standing wave in the resonator, and maintain it at a constant amplitude. The pickoff is typically implemented with a plurality of capacitive electrodes that are positioned around the hemispherical resonator to sense the azimuth orientation of the resonator's standing wave pattern. The capacitive electrodes used for the pickoff require high impedence drive circuits to avoid parasitic capacitances. These circuits are highly precise, expensive and temperature sensitive.

The azimuth orientation of the standing wave relative to a fixed point on the resonator varies as the gyro is rotated, and is calculated by comparing the voltage signals from the pickoff electrodes. The gyro electronics use a calibration factor (scale factor) to transform the voltage signals from the pickoff electrodes into a gyro rotation angle. Noise and drift in the gyro electronics introduce some uncertainty in the calculated rotation angle. This uncertainty is generally referred to as a scale factor error and bias drift error.

SUMMARY OF THE INVENTION

The present invention provides a vibratory rotation sensor of the above mentioned type with improved accuracy and that can be driven with lower impedence drive circuits.

This is accomplished by utilizing non-capacitive mechanical displacement detectors to detect the flexural standing wave pattern in a hemispherical resonator. In a preferred embodiment, a plurality of tunneling transducers are positioned around the hemispherical resonator to detect the standing wave. A "force-to-rebalance" mechanization mode is preferably used for calculating the sensor's rate of rotation, with a transducer placement that allows for constant calibration of the sensor's scale factor. In addition, a pickoff transducer orientation is provided that allows for simultaneous calculation of the sensor's rate of rotation angle and any linear acceleration that is exerted on the hemispherical resonator, thereby allowing the sensor to be simultaneously used as a rotation sensor and an accelerometer.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 8b is a detailed view of a portion of FIG. 8a;

FIGS. 10a–10f are more detailed block diagrams of the circuitry of FIG. 5.

DETAILED DESCRIPTION OF THE INVENTION

Figure 1:
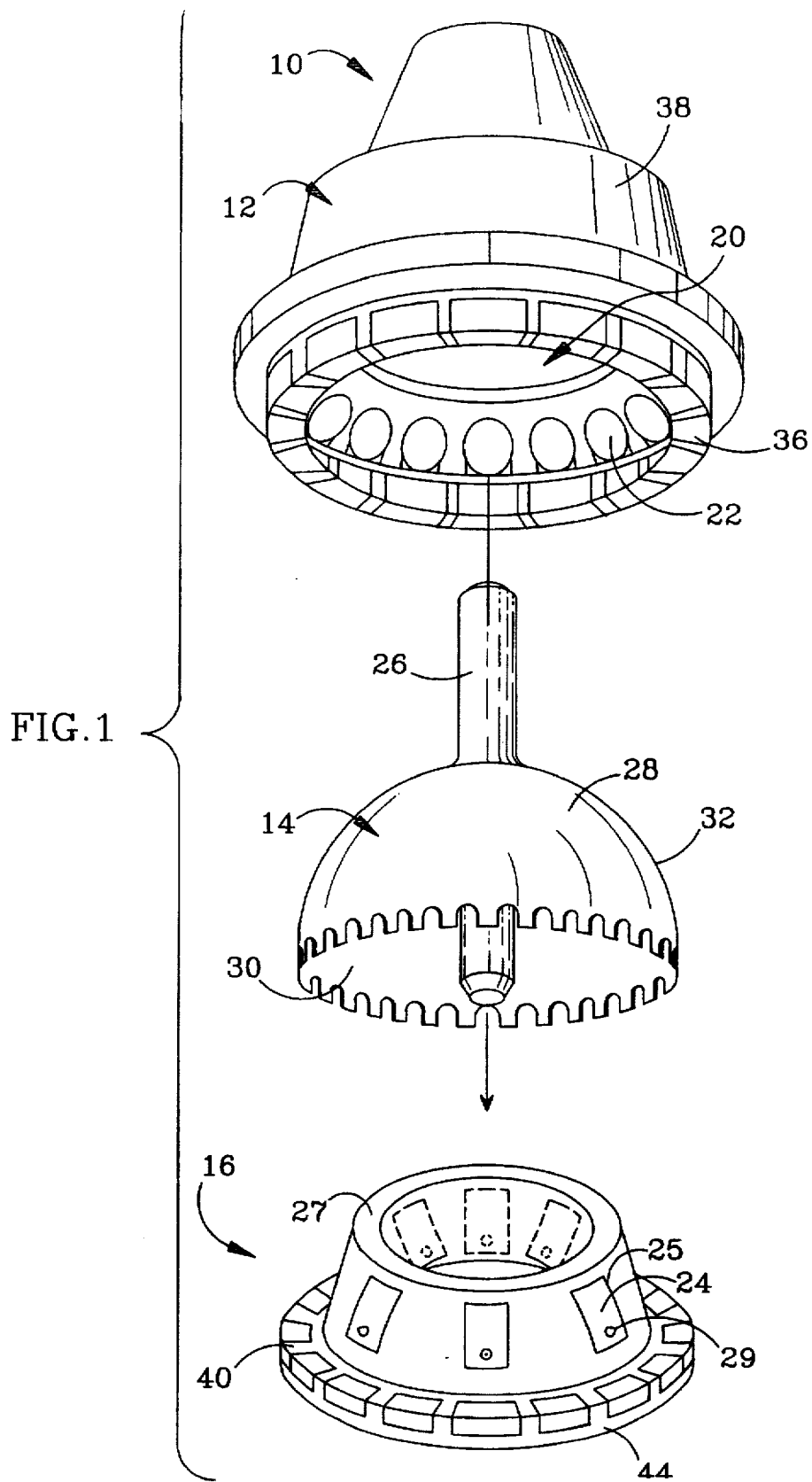
FIG. 1 is an exploded perspective view of the principal components of the present invention.
Figure 2:
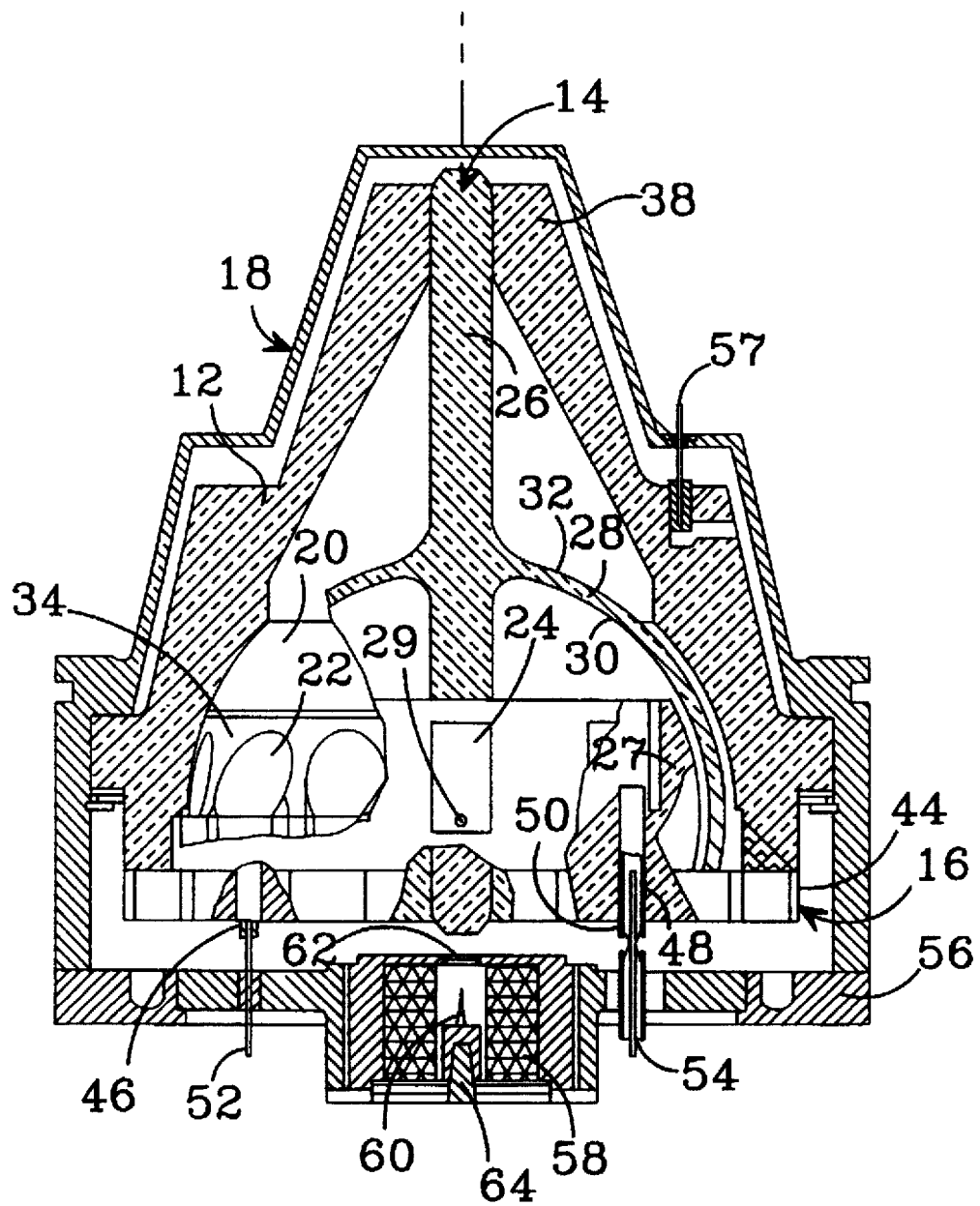
FIG. 2 is a sectional view of the sensor of FIG. 1

Referring to FIGS. 1 and 2, the gyro 10 comprises a forcer 12, a hemispherical resonator 14 and a pick-off 16, all of fused quartz, joined together with indium and enclosed in a vacuum metal housing 18.

The forcer 12 contains a ring forcer electrode 20, used to sustain vibration of the resonator 14 at constant amplitude, and sixteen discrete forcer electrodes 22, used to suppress quadrature vibration of the resonator. The pick-off 16 contains eight non-capacitive pick-off electrodes, preferably tunneling transducers 24, that are used to sense the azimuth orientation of the vibration pattern of resonator 14.

The resonator 14 is formed with a stem 26 that passes through the hemisphere 28. The resonator stem 26 serves two purposes. It provides a means for supporting the resonator 14 with minimal damping of its vibratory motion, and it provides separate electrical connections to the inner and outer hemispherical surfaces 30 and 32 respectively. The length of the stem 26 is chosen so that the mounting surfaces are more than three stem diameters removed from the transition area between the stem and the hemisphere.

The forcer electrodes 22 address the outer surface 32 of the hemisphere 28, and the shape of the discrete electrodes 22 is circular. A conductive area 34 surrounds the discrete electrodes 22 and separates them from the ring forcer electrode 20. This conductive surface 34 continues to the outside metallized area of the forcer where it is connected to ground, and is referred to as the "ground plane". Its purpose is to reduce the interelectrode capacitive coupling. The circular form of the discrete electrodes 22 also reduces the interelectrode coupling and provides a shape that can more easily be located and formed with adequate precision.

The pick-off transducers 24 address the inner surface 30 of the resonator 14. The operation and manufacture of tunneling transducers are described in T. W. Kenny, et al., "MICROMACHINED TUNNELING ACCELEROMETER", *NASA Tech. Brief*, Vol. 17, No. 11, Item #61, November 1993, pp. i, 1–4, 1a–3a; T. W. Kenny, et al., "TECHNIQUES FOR MASS PRODUCTION OF TUNNELING ELECTRODES", *NASA Tech, Brief*, Vol. 17, No. 11, Item #1, November 1993, pp. i-ii, 1–3; and S. E. McBride et al., "SCANNING-TUNNELING-MICROSCOPE DETECTION OF SURFACE ACOUSTIC WAVES", *Proceedings of the 1992 IEEE Ultrasonics Symposium*, (1992), pp. 445–448.

The tunneling transducers 24 are fabricated on silicon substrates 25, and are attached to the pickoff housing 27 by countersinking the silicon substrates 25 into the housing 27 and attaching them with indium bonding techniques. The transducers 24 are positioned on the housing 27 so that the distances between their respective tunneling tips 29 and the inside surface 30 of the resonator are small enough to allow quantum-mechanical tunneling to take place between the transducer tips 29 and the resonator surface 30, preferably in an amount no greater than approximately 13 microns. In operation, a tunneling current is established between the tunneling tip 29 and the resonator surface 30. The standing wave pattern in the resonator 14 causes it to flex, which changes the spacing between the transducer tip 29 and the resonator surface 30. The change in the spacing causes a change in the tunneling current that is measured as a voltage in the gyro electronics.

The conductive area of each discrete forcer electrode 22 extends to the rim 36 of the forcer housing 38 (the surface at which the pick-off and forcer housings are joined) and thence across the rim 40 of the pick-off housing 27 to its outside surface 44. Circuitry is plated on this surface 44 to provide the desired interconnections between discrete electrodes 22 and to carry the leads to their metal socket terminals 46. The electrical connection to the inner surface 30 of the resonator is also made using a conductor that is plated on the outside flat surface of the pick-off housing 27 and extends from the resonator stem to a metal socket (not shown). The electrical connection to each pick-off transducer 24 is carried through a hole in its center by a wire that attaches to the inside of a quartz tube 48. The tube 48 passes through the pick-off housing 27 to its flat outer surface and provides a coaxial conductor for the pick-off signal (inside surface of the tube) and its guard (outside surface of the tube). This tube 48 terminates in a metal coaxial socket 50.

The outer surface 44 of the pick-off housing 27 carries two circuit arrays, one having eight coaxial sockets 50, and the other, eight single-conductor sockets 46. Connections from these sockets are carried through the metal vacuum housing 18 by eight metal pin feedthroughs 52, and eight coaxial feedthroughs 54 built into the pick-off cover 56 of the vacuum case.

In addition to the sixteen electrical feedthroughs 52, 54 of the pick-off cover 56, there are two single-pin feedthroughs 57 in the main vacuum case 18 to bring out the connection from the ring forcer electrode and the one from the resonator outside surface. The latter feedthrough is not shown.

A gas getter 58 is used to maintain a high vacuum inside the gyro case in order to reduce aerodynamic damping of the resonator 14 to an acceptable level. The getter 58, a commercially available device of sintered zirconium, is preactivated and sealed inside a titanium capsule. The capsule is designed so that it can be opened to the inside volume of the vacuum housing 18 after final sealing of the gyro 10. This feature provides the opportunity to observe the rate at which internal gas pressure builds up following sealing of the gyro 10 so that the quality of the hermetic seal can be determined. The internal gas pressure can be estimated from a measurement of the damping time of the resonator 14, and the rate at which pressure builds up can then be used to predict the useful life of the gyro 10. (After the getter 58 is opened to the internal volume of the gyro, the gas pressure immediately drops to a low value, so that no further information about seal quality can be obtained until the getter's capacity starts to be exceeded.) The getter penetrator is shown in FIG. 2. It consists of a hardened steel point 60 located near a thin membrane section 62 of the capsule inner wall. The penetrator 60 can be made to puncture the membrane 62 by applying pressure to the penetrator mounting 64 from outside the getter 58.

Figure 3A:
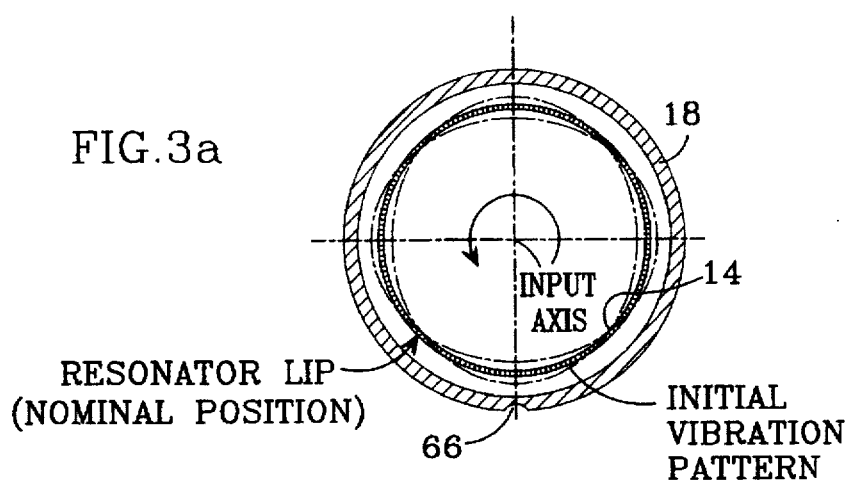
FIGS. 3a and 3b illustrate the precession of the antinodes of a standing wave pattern in response to rotation of the hemispherical resonator.
Figure 3B:
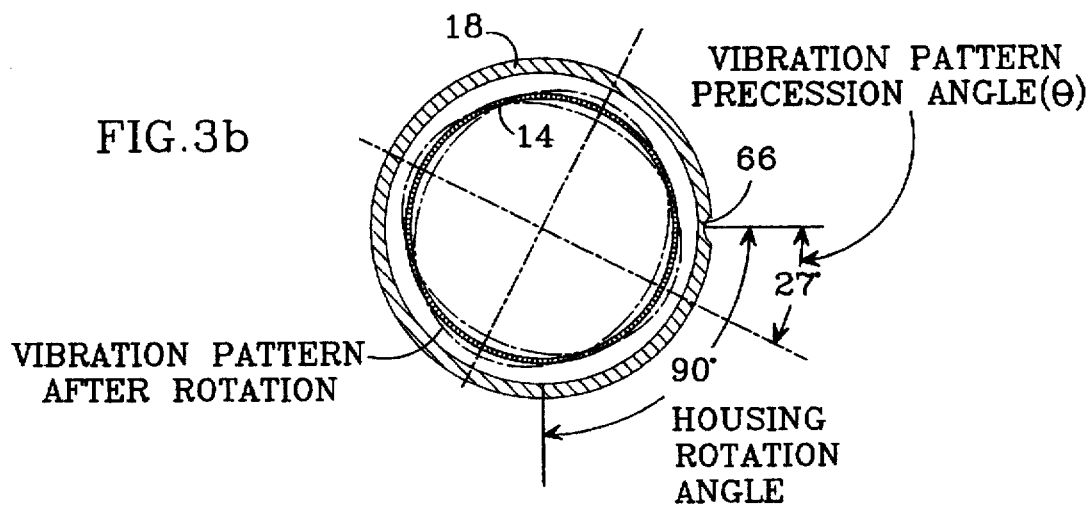

FIGS. 3a and 3b illustrate how the vibration or flexural standing wave pattern responds to inertial rotation of the resonator 14 about its polar axis. Assume that the vibration pattern antinodes are initially aligned with the case reference notch 66, as shown in FIG. 3a. During a ninety-degree counter-clockwise rotation of the resonator 14, the antinodes will precess relative to the case by approximately 27 degrees in the clockwise direction. The relative precession rate, or angular gain, is very nearly three-tenths, and is a geometric constant of the resonator 14.

Precession of the vibration pattern in response to an input inertial rate can be described in an alternate, but equivalent, manner. The inertial rotation can be thought of as causing the amplitude of the vibration pattern in FIG. 3a to decrease and a new component pattern to build up whose antinodes lie 45 degrees from the original pattern antinodes; that is, whose antinodes coincide with the nodes of the original pattern. The superposition of these two pattern components produces the resultant pattern. In FIG. 3b, for example, the superposition of the two pattern components produces a resultant pattern whose antinodes lie 27 degrees from the original pattern antinodes.

NORMAL MODES-QUADRATURE VIBRATION

The vibration pattern may be considered to be made up of components along an arbitrarily chosen pair of axes. The most convenient axes for describing vibration components are the pick-off electrode axes. There is a unique set of axes, however, that have the property that the components of the vibration pattern along them are uncoupled in the absence of rotation (and in the absence of certain perturbations that will be considered later). These are the so-called normal modes axes. Their location is determined by the resonator mass/stiffness variation in the circumferential direction. The normal mode axis locations can be visualized for the particularly simple mass distribution shown in FIG. 4. A vibration pattern with antinodes along the axes through the added masses (the solid axes) will oscillate at a lower natural frequency than a pattern with antinodes along the dashed axes. The lower natural frequency is hereinafter referred to as $\omega_2$ and the higher natural frequency as $\omega_1$. Also, the normal mode axis set with the lower natural frequency $\omega_2$ is displaced from a 0-degree electrode (hereinafter defined) by an angle $\theta_w$.

If a vibration pattern is established with antinodes that are not along either of the normal mode axis sets, each of its normal mode components will oscillate at their respective natural frequency. If the normal mode components were initially in phase, their phases would gradually separate at a rate equal to the difference between the natural frequencies. The transfer of energy between the normal mode components caused by rotation is responsible for the precession of the vibration pattern. This transfer is highly phase sensitive because rotation causes each normal mode to be forced at the frequency (and phase) of the other. The normal mode components of the vibration must therefore be kept in phase in order to insure a constant gyro scale factor. Preventing phase separation between these normal mode components is one of the essential gyro control functions.

When the phase separation between the normal mode components is small, the resulting vibration pattern is nearly identical with the pattern shown in FIGS. 3a and 3b. The main difference is that, where the nodes should be, there is a small amplitude vibration in phase-quadrature to the main vibration. The amplitude of this quadrature vibration is proportional to the phase difference of the normal mode components. Means for suppressing this nodal quadrature vibration are discussed below.

Figure 5:
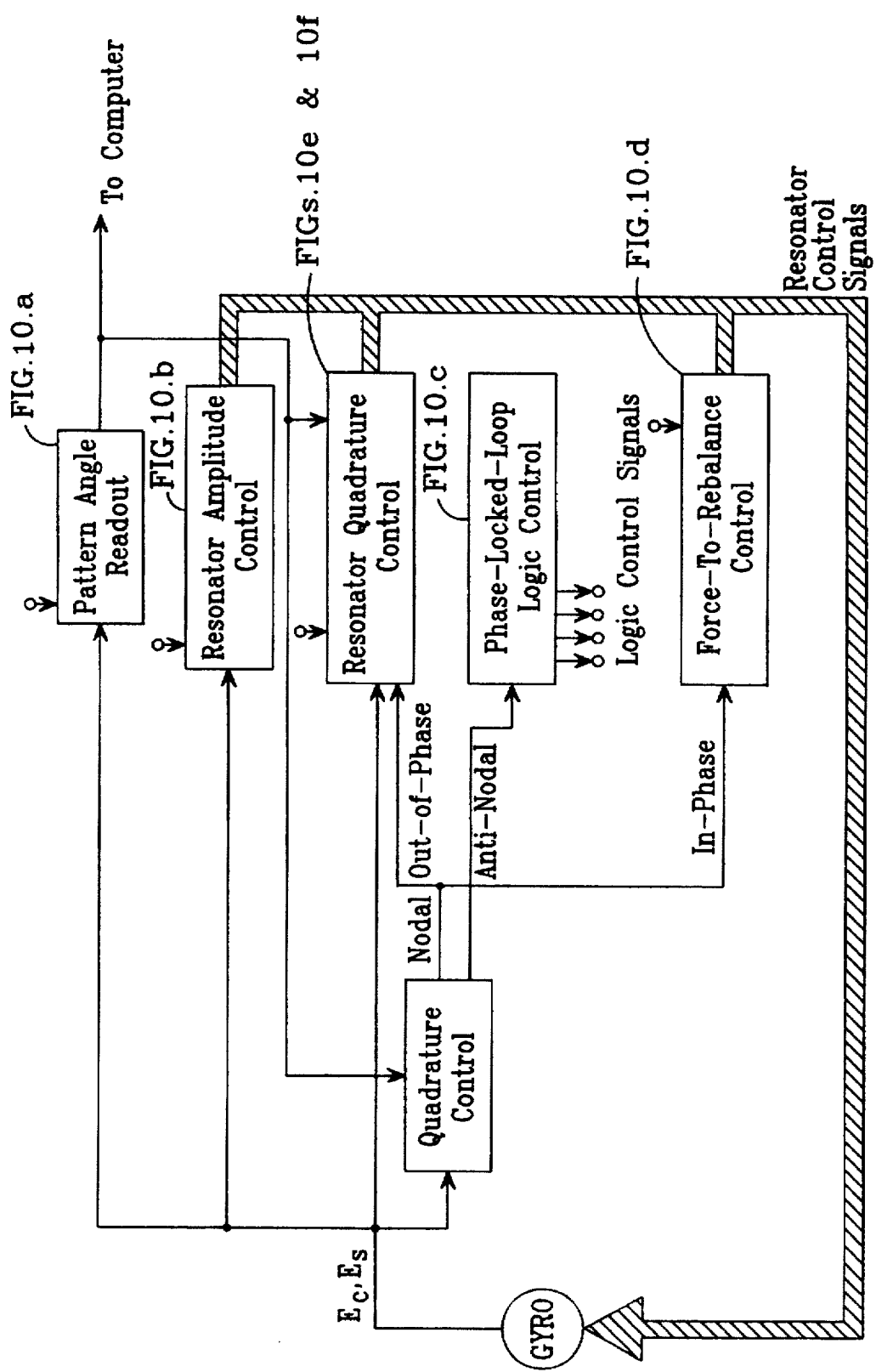
FIG. 5 is an overall block diagram of the signal processing and control circuitry of the present invention.

The purpose of the HRG electronics, illustrated in FIG. 5, is to drive and control the resonator vibration and monitor the location of the pattern. If a whole-angle readout mechanization mode is used, the angle over which the gyro is rotated is directly determined by the location of the vibration pattern using the Pattern Angle Readout circuit. If a force-to-rebalance (FTR) mechanization mode is used, the azimuth orientation of the vibration pattern is maintained at a predetermined position with respect to the resonator, even in the presence of rotation about the polar axis, with the Force-To-Rebalance Control circuit. The FTR control circuit determines the rate at which the gyro is rotated by monitoring the discrete forcer electrode voltages that are required to maintain the vibration pattern at the predetermined position in the presence of gyro rotation.

The gyro electronics carry out three major function that are common to both whole-angle readout and FTR mechanization modes: (1) reference phase generation, (2) amplitude control, and (3) quadrature suppression. Each of these functions are discussed below.

PICK-OFF TRANSDUCER FUNCTION

The eight pick-off transducers 24 are shown in FIG. 1. They address the resonator 14 across a small gap so that a tunneling current is established between the tip 29 of each transducer 24 and the portion of the resonator that it addresses. The variations in the gap distance that occur as the resonator vibrates result in electrical signals proportional to the time-varying resonator displacements with respect to the pick-off transducers. These eight pick-off signals are combined electrically to generate two signals ($E_c$, $E_s$) proportional to two independent components of vibration. If one of the pick-off transducers is arbitrarily labeled the 0-degree transducer, one of the combined signals is obtained by summing the signals from the 0-degree and 180-degree transducers and subtracting the sum of the signals from the 90-degree and 270-degree transducers. The combined signal ($E_c$) obtained in this way discriminates against rigid body motions of the resonator with respect to the transducers. A similar combination of the remaining four transducer signals yields a combined signal ($E_s$) representing the other independent vibration component.

REFERENCE PHASE GENERATOR

Figure 10A:
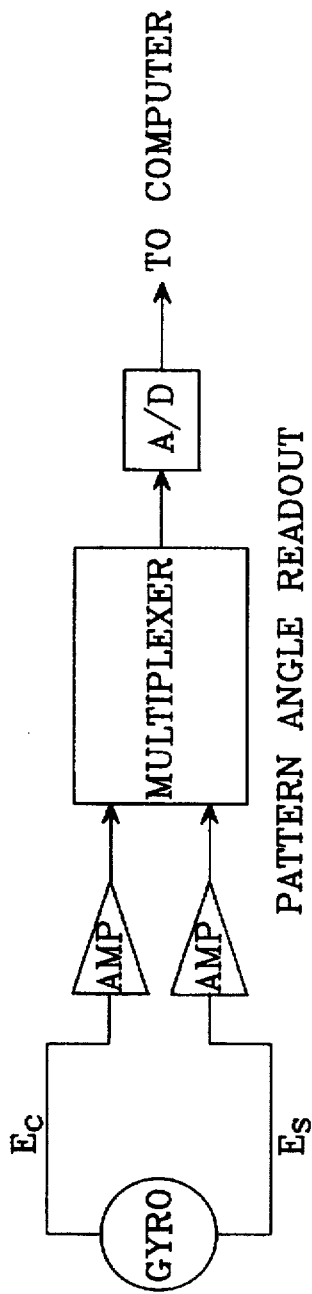
Figure 10B:
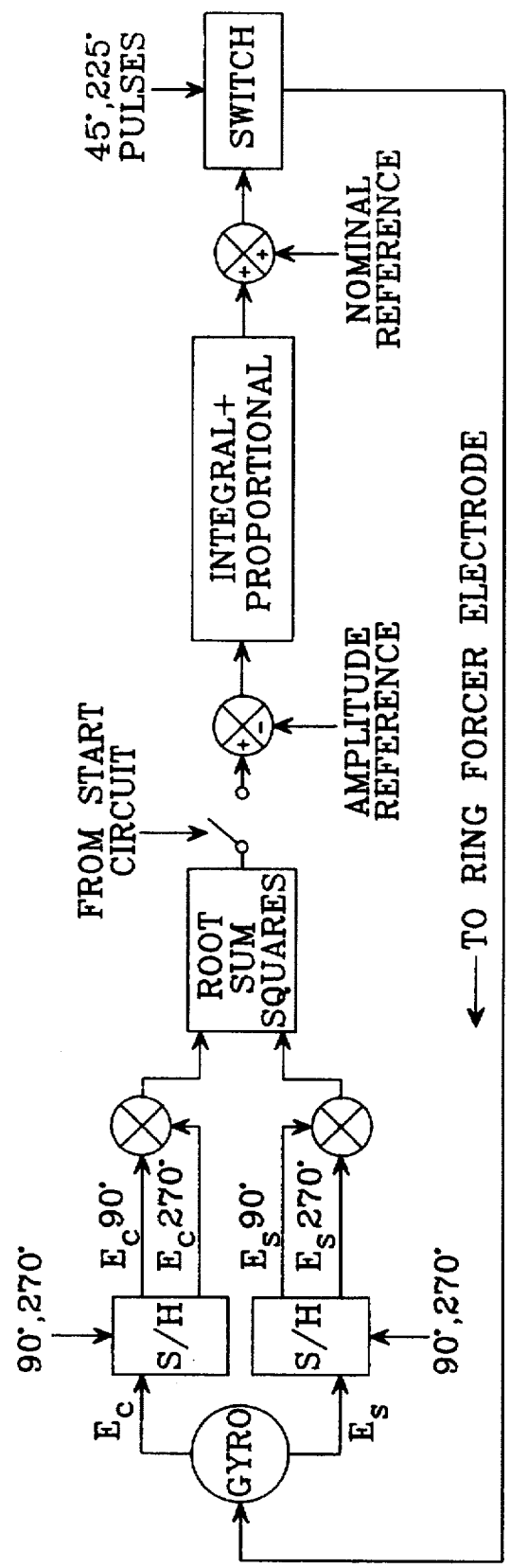
Figure 10C:
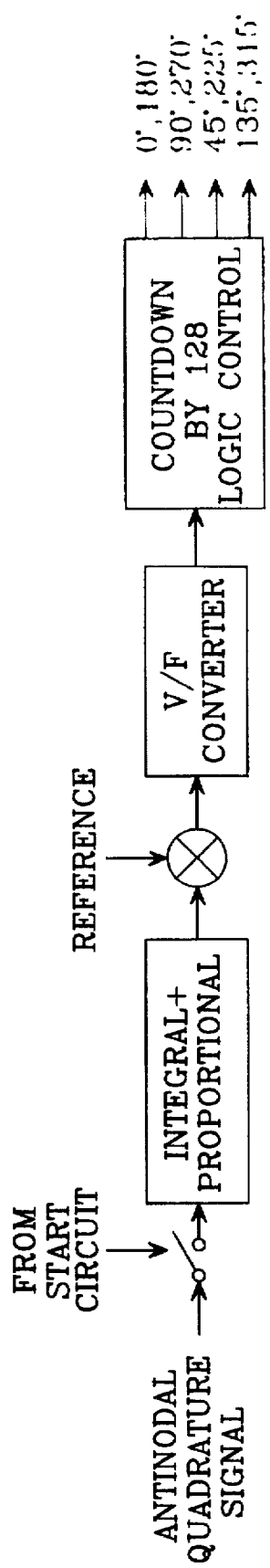

A reference phase generator (see FIG. 10c) produces timing signals as shown. $E_c$ and $E_s$ are demodulated with respect to the timing signals of the reference phase generator. The components of $E_c$ and $E_s$ that are in phase with the reference signal are used to derive an error signal for use in the amplitude control loop (FIG. 10b). Also the integral of $E_c$ and $E_s$ are used to identify the readout angle $\theta$ i.e., the angle between the pattern antinodes and the 0-degree electrode axis sets (FIG. 10a).

The quadrature components of $E_c$ and $E_s$ are transformed in a computer to generate a nodal quadrature signal and an antinodal quadrature signal. For example, the quadrature component of $E_c$, (COS QUAD), is multiplied by the cosine of twice the readout angle, (COS $2\theta$), and is added to the quadrature component of $E_s$, (SIN QUAD), multiplied by the sine of twice the readout angle, (SIN $2\theta$), to produce the antinodal quadrature signal. Similarly the nodal quadrature signal is produced by multiplying the COS QUAD by SIN $2\theta$ and subtracting the product of SIN QUAD and COS $2\theta$. The aforementioned expressions may be written as:

(1) ANTINODAL QUAD=(COS QUAD)COS $2\theta$+(SIN QUAD)SIN $2\theta$ (2) NODAL QUAD=(COS QUAD)SIN $2\theta$−(SIN QUAD)COS $2\theta$ The nodal quadrature signal is used as the error signal in the quadrature control loop (FIG. 10e and 10f) that keeps both components of the vibration pattern in phase. Thus, (3) Quadrature Control Loop Error Signal=$\epsilon_{quad}\dot{\epsilon}_{quad}$=C1 (NODAL QUAD)+C2∫(NODAL QUAD)dt where C1 and C2 are proportionality constants. The antinodal quadrature signal is used as the error signal for the phase-locked loop that keeps the phase of the reference phase generator locked to the phase of the vibration.

The resonator oscillation frequency has a temperature sensitivity of about 80 parts per million per degree Centigrade due to the temperature coefficient of Young's modulus of fused quartz. Since the reference phase generator is locked to the resonator, its frequency provides a direct measure of the temperature of the resonator and is used for thermal modeling.

AMPLITUDE CONTROL

Figure 6:
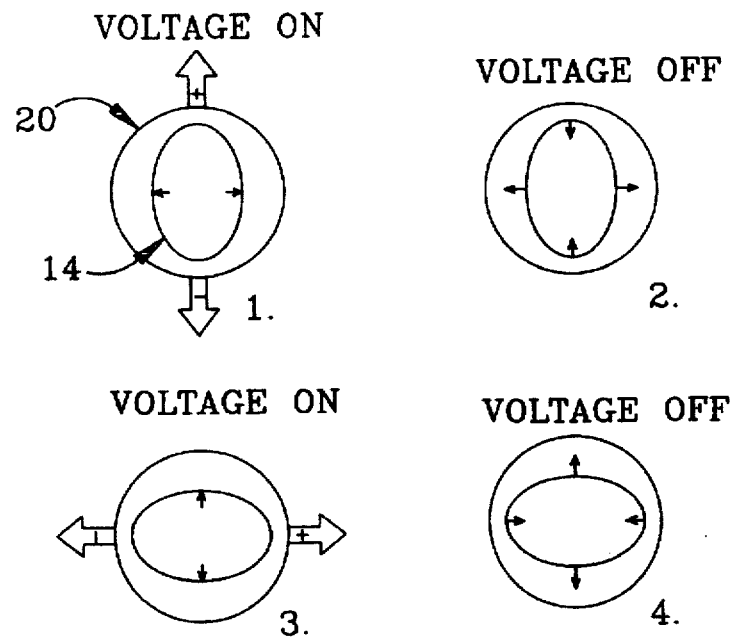
FIG. 6 illustrates the operation of the capacitive ring forcer used in the sensor of FIG. 1.

The vibration is sustained at constant amplitude through the application of a square wave voltage to the ring electrode 20. The square wave timing is controlled by the reference phase generator. The voltage is on during the first and third quarters of the resonator's oscillation cycle, and off during the second and fourth as shown in FIG. 6. Thus, a force is exerted on the resonator 14 during the time the amplitude is increasing, and no force is exerted on the resonator during the time the amplitude is decreasing. The net force per unit area exerted on the resonator is inversely proportional to the square of the local gap. Therefore, as the resonator's flexing motion carries it from its neutral (circular) shape to its fully flexed (elliptical) shape, the attractive force increases in the smaller gap regions by more than it decreases in the larger gap regions. The net force the ring electrode 20 exerts on the resonator 14 thus lies along the antinodal direction of the vibration pattern; hence, energy is supplied to make up for damping without causing the pattern to drift toward a particular location.

The error signal for the amplitude control loop is the difference between a reference voltage and a voltage proportional to the sum of the squares of the in-phase components of $E_c$ and $E_s$.

QUADRATURE CONTROL

Figure 4:
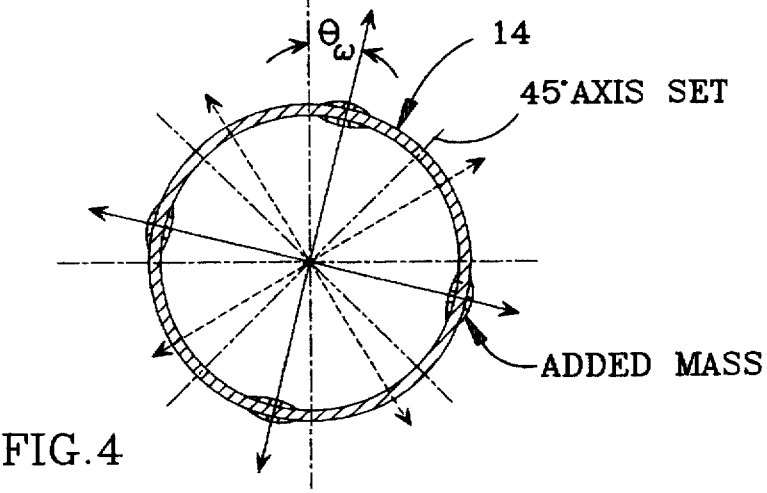
FIG. 4 illustrates the location of the resonator's normal mode axes, as determined by the variation in the resonator's mass and stiffness along its circumference.

Two normal modes having slightly different frequencies ($\omega_1$, $\omega_2$) result from slight variations in resonator characteristics having four-fold symmetry in the circumferential direction, as, for example, the mass variations in FIG. 4. The strategy of quadrature control adopted for the HRG is to introduce electrical spring forces to shift the normal mode axes to coincide with the vibration pattern.

Figure 7:
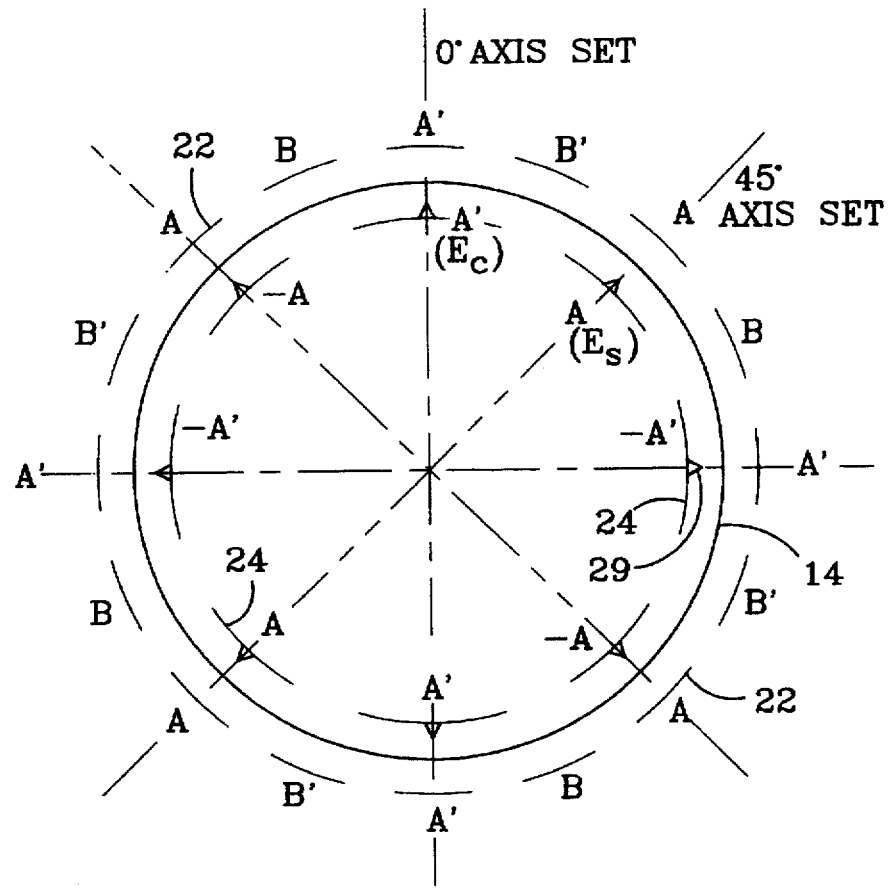
FIG. 7 is a pictorial representation of the forcer electrode and transducer pickoff electrode structure used in a whole-angle readout configuration.

Voltages are placed on discrete forcer electrodes in groups of four. In FIG. 7, for example, arbitrarily calling one of the electrodes the 0-degree electrode, a common voltage $V_A$, (which may be zero) is placed on the 0-degree, 90-degree, 180-degree, and 270-degree electrodes (A' electrodes). Placing common voltages on such a set of four electrodes contributes to the definition of the normal modes, not because the forces act like added mass as in FIG. 4, but because they act like added "springs"; like added negative springs, in fact. Just as in the case of the ring forcer, the force per unit area on the resonator in the vicinity of an electrode at a different electrical potential is attractive, with a magnitude proportional to the square of the voltage and inversely proportional to the square of the local gap. With four symmetrically located electrodes at a common potential, the force per unit area on an undeformed resonator is radially outward and there is no net force tending to excite the deformation corresponding to the n=2 vibration mode. When the resonator deforms, however, there is a net force tending to make it deform still further. That is, the force that the four electrodes exert on the vibrating resonator is a negative spring force, or negative stiffness.

The quadrature control loop (FIG. 10e and 10f) functions as follows. As described in the Reference Phase Generator paragraphs above, the quadrature parts of the combined pick-off electrode signals are transformed in the computer to generate a signal proportional to a linear combination of the amplitude of the quadrature vibration component at the nodes of the main pattern and its integral as indicated by equation (3). This nodal quadrature error signal is amplified with high gain and distributed on the discrete forcer electrodes 22 in accordance with the following equations (4) and (5). As indicated in equations (4) and (5), the nodal quadrature error signal (the third term on the right hand side of each equation) is respectively added to or subtracted from the first two terms which relate to the Open Loop-Quadrature Vibration Drift Compensation which will be discussed later. In the discussion immediately below, the first two terms will be assumed to be zero.

VA' or VA=(4)

$$S\left[\left|\Delta\omega\cos 4\theta_\omega + \frac{C_0}{1-\nu}\left(\frac{W_{pk}}{h}\right)^2 \omega\cos 4\theta + G_{quad}\sin 4\theta\right|\right]^{1/2}$$

VB' or VB=(5)

$$S\left[\left|\Delta\omega\sin 4\theta_\omega + \frac{C_0}{1-\nu}\left(\frac{W_{pk}}{h}\right)^2 \omega\sin 4\theta + G_{quad}\cos 4\theta\right|\right]^{1/2}$$

where $\omega_1$, $\omega_2$=normal mode frequencies;
$\theta_\omega$=azimuth of $\omega_2$;
$\Delta\omega=\omega_1-\omega_2$;
$W_{pk}$=peak resonator deflection at lip
h=resonator wall thickness
γ=Poisson's ratio
Co=dimensionless constant ~0.1
S=voltage conversion factor
G=Quadrature control loop gain The voltages are applied on either the A' or A set of electrodes and on either the B' or B set of electrodes. The sets chosen are determined by the equations (4) and (5). In the equation dealing with the A and A' electrode set, if the term inside the brackets is positive the voltage is placed on the A electrode set. If the term is negative the voltage is placed on the A' electrode set. Similarly, for the B and B' electrode set, if the term is positive the voltage is placed on the B set and if negative on the B' set. Distribution of the voltage this way produces a negative electrical spring along an axis set 22.5 degrees from the pattern antinodes. When the steady state is reached (in a short time because of the high gain), this electrical spring causes the normal mode axes, including the spring contributions, to coincide with the vibration pattern nodes and antinodes, and the nodal quadrature vibration is driven to zero.

The effectiveness in suppressing growth of quadrature vibration of a negative electrical spring along an axis set 22.5 degrees from the pattern antinodes may be understood from a slightly different point of view. It was explained earlier that, when the phase difference between the normal node components of the vibration is small, the pattern is like that of FIGS. 3a and 3b, with the main difference being that where the nodes should be there is a small amplitude vibration in phase-quadrature to the main vibration. An equivalent description, valid when the phase difference between the normal mode components is small, is that the vibration is composed of two components. One of the components has antinodes along an axis set 22.5 degrees to the right of the antinodes of the main pattern while the other component has antinodes 22.5 degrees to the left of the main pattern. The two components are equal in amplitude (0.707 times the amplitude of the main pattern) and have a phase difference proportional to the phase difference of the normal mode components and, therefore, proportional to the nodal quadrature signal. To prevent growth of nodal quadrature vibration, then, it suffices to cause the two 22.5-degree pattern components to oscillate at the same frequency and in phase with each other. The negative electrical spring is therefore applied along the 22.5-degree axis set corresponding to the component oscillating at the higher frequency. The quadrature control loop (FIGS. 9f and 9g) adjusts the magnitude of the negative spring to reduce the frequency of the one component to equal that of the other and to drive the phase difference to zero.

READOUT IN WHOLE-ANGLE MECHANIZATION MODE

Generation of the pick-off transducer signals was described above under Pick-Off Transducer Function. The signal processing involved in computing the location of the vibration pattern antinodes is shown in FIG. 10a. The angle θ in FIG. 3b is to be determined. It is the angle from the 0-degree pickoff transducer axes to the vibration pattern antinodal axes (θ is 27 degrees in FIG. 3b). $E_c$ and $E_s$ are sinusoids varying at the vibration frequency, with amplitudes proportional to the vibration components along the 0-degree and 45-degree pick-off transducer axes, respectively, and are therefore proportional to the cos 2θ and sin 2θ, respectively.

The object of the processing is to determine the ratio of the amplitudes in order to identify θ. The $E_c$ and $E_s$ signals are amplified and fed into a multiplexer. After passage through an A/D coverter, the signals are sent to a computer, for determination of the ratio of the signal amplitudes.

READOUT IN FORCE-TO-REBALANCE MECHANIZATION MODE

Figure 10D:
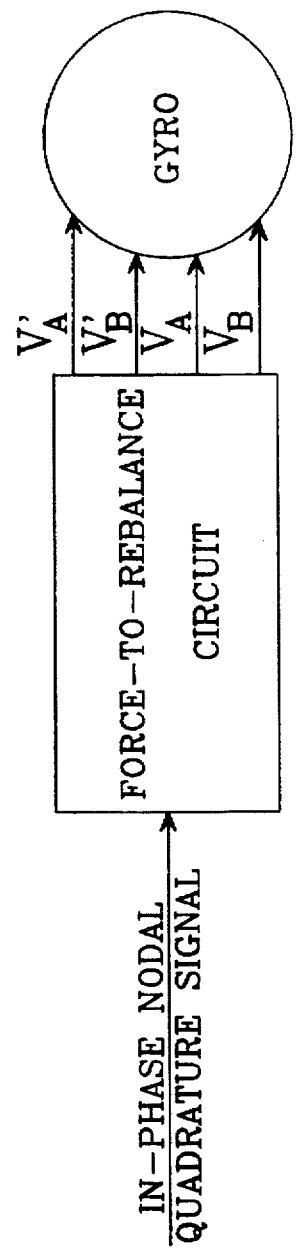

In FTR mode, the azimuth orientation (or phase) of the vibration pattern is maintained at a pretermined position with respect to the resonator by the FTR control circuit illustrated in FIG. 10d. If this position is arbitrarily labeled the 0 degree position, the FTR control circuit receives the in-phase component of the quadrature signal, and adjusts the voltages on the forcer electrodes to force the phase of the vibration pattern back to the 0 degree position. The voltage signals required to accomplish this are proportional to the rate at which the resonator is rotated about its polar axis.

Figure 8A:
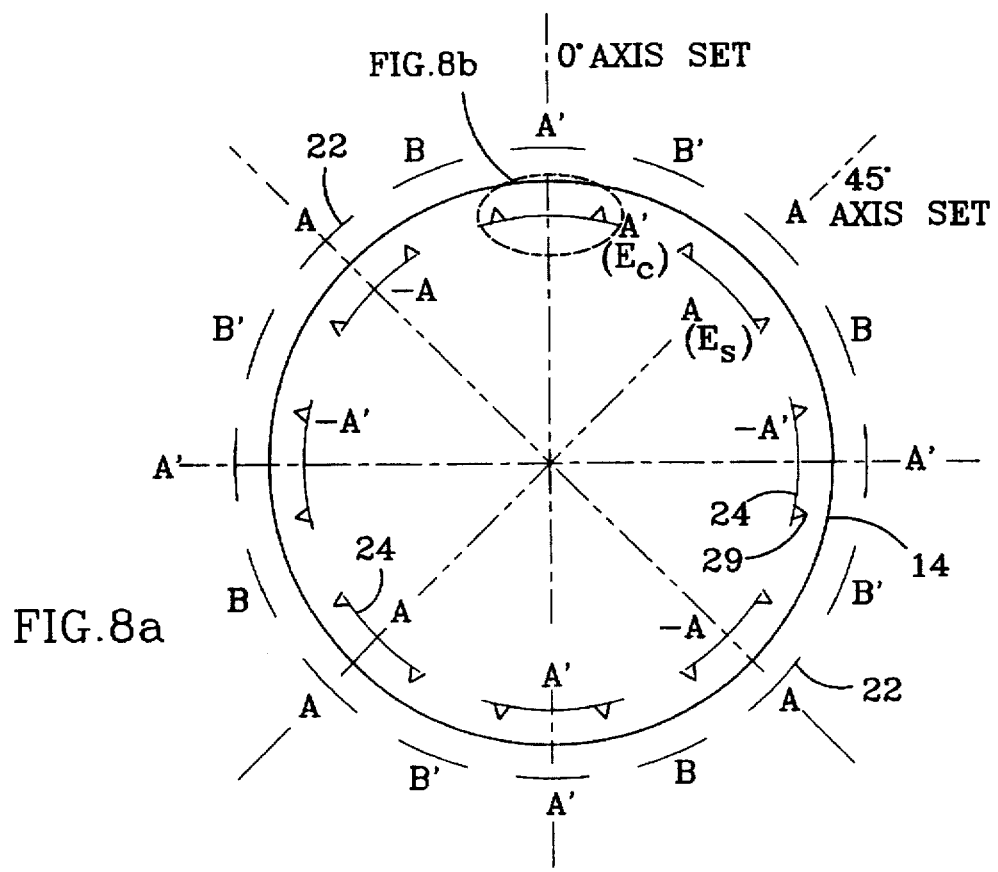
FIG. 8a is a pictorial representation of the forcer electrode and transducer pickoff electrode structure used in a force-to-rebalance configuration.

In FTR mode, two pickoff transducers are preferably formed on each silicon substrate 24, and are positioned on the pickoff housing so that their respective tips 29 are symmetrically positioned on each side of a nodal or antinodal position, as illustrated in FIG. 8a. The angular separation between the two transducer tips on each substrate 24 is preferably not more than 200 arc-seconds. This pickoff configuration allows for constant calibration of the gyro's scale factor.

The statement that "the angular separation betweeen the two transducer tips on each substrate 24 is preferably not more than 200 arc-seconds" relates to the preferred embodiment of the invention and is not intended to limit the invention to angular separations no greater than 200 arc-seconds. FIG. 8a illustrates an angular separation (scaled from the drawing) of about 25 degrees which is perhaps the largest angular separation that one might want to use in an embodiment of the invention.

Calibration of the scale factor is accomplished by constantly dithering the phase of the vibration pattern so that its nodal and antinodal points are dithered between the two transducer tips 29 on each pickoff. Because the tips are separated by a known angular value, the voltage required to dither the nodal and antinodal points between them is calibrated to that known angular value. The dithering of the vibration pattern phase is accomplished with the FTR control circuit (FIG. 10d) and is done at a dithering frequency that is much higher than the maximum rotation rate that will be measured by the gyro, preferably not less than 100 Hz.

Figure 8B:
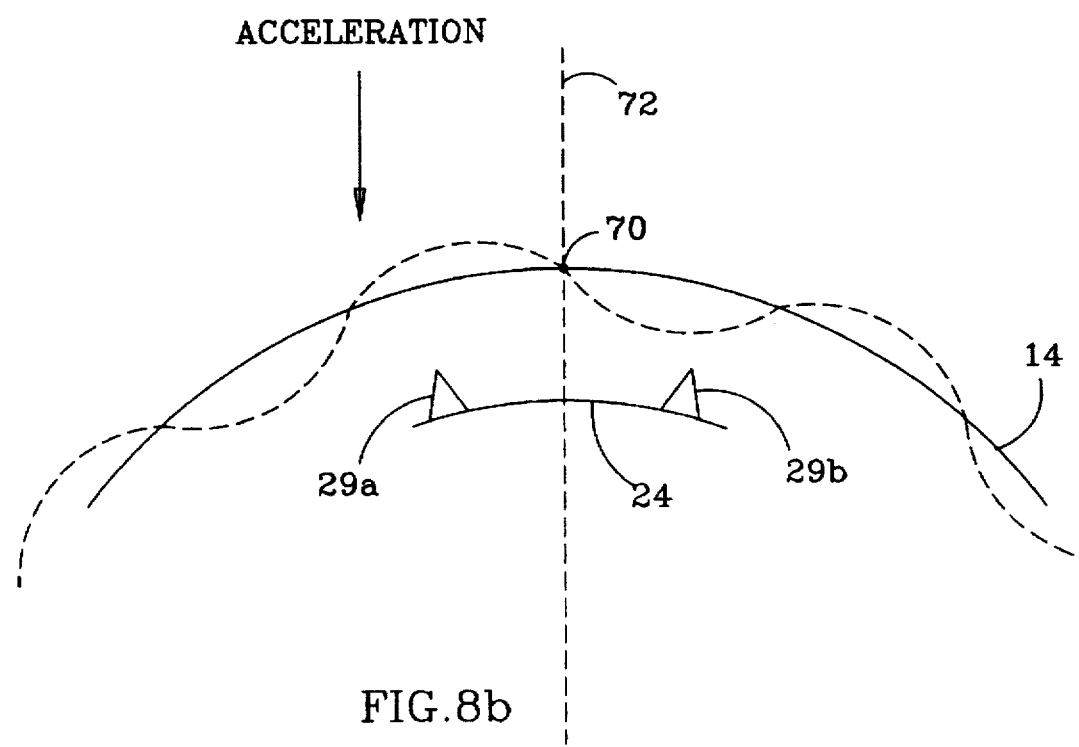

The transducer tips that are located on each side of a nodal point can be used to calculate acceleration along a direction that runs parallel to the nodal line on which the nodal point lies. FIG. 8b is a detail view of a section of FIG. 8a that contains transducer tips 29a and 29b on each side of a nodal point 70. The resonator 14 and its stem 26 flex by an equal amount, but in opposite directions, on each side of the nodal point 70. As a result, if the signals from tips 29a and 29b are added, the component of the tip signals that correspond to the resonator 14 flexure will cancel. However, if the resonator experiences an acceleration in a direction parallel to the nodal line 72 on which the nodal point 70 lies, the resulting resonator deflection will be in the same direction on each side of nodal point 70. As a result, the addition of the signals from tips 29a and 29b will contain signal components due to acceleration, while cancelling the components due to the standing wave resonator flexure.

To take advantage of this feature, the FTR control circuit is preferably implemented so that it operates on the transducer signals to extract an acceleration value. In this way, the gyro can operate as both a rotation sensor and an accelerometer capable of measuring acceleration along each nodal line direction.

Figure 8C:
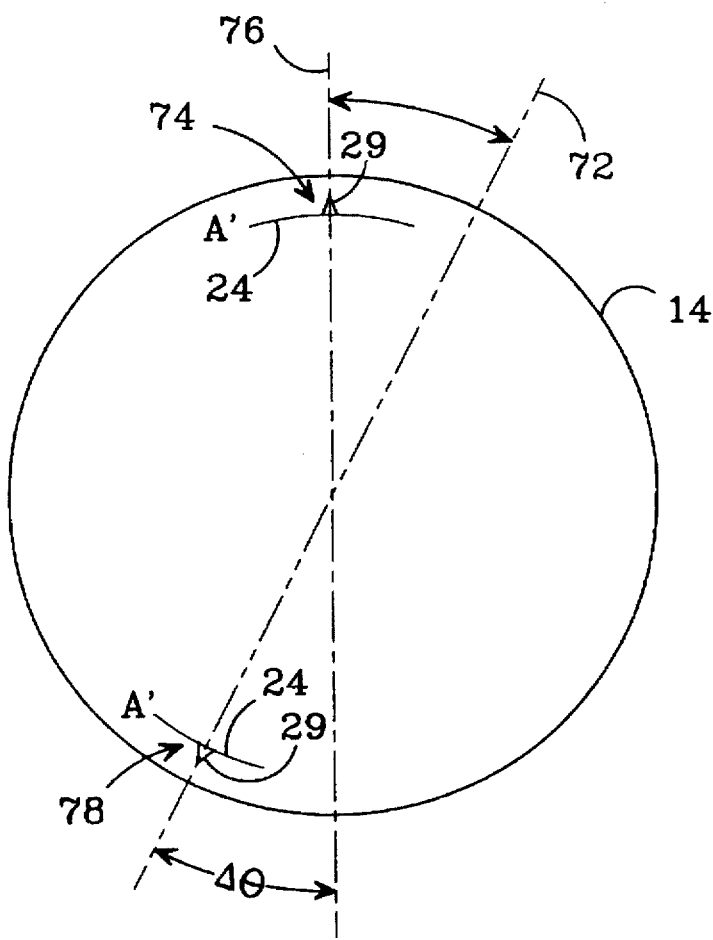
FIG. 8c is a pictorial representation of an alternative transducer pickoff orientation used in a force-to-rebalance configuration.

FIG. 8c illustrates a pickoff configuration that allows for constant scale factor calibration with the use of a single transducer at each pickoff location. For ease of illustration, only two pickoffs are shown. The pickoffs are positioned so that a the tip 29 of a first transducer 74 lies on a nodal or antinodal line 76. A second transducer 78, which would normally be located on the opposite end of the nodal or antinodal line (180 degrees from the first transducer 74), is angularly offset from the 180 position by $\Delta\theta$, so that the two transducers are angularly separated from each other by 180 degrees plus or minus $\Delta\theta$ (depending on whether you measure clockwise or counterclockwise). The angular offset $\Delta\theta$ is preferably not more than 200 arc-seconds. The nodal or antinodal line is then dithered between transducers 78 and 74 and the gyro scale factor is calibrated in the manner described above for FIG. 8a.

The statement that "the angular offset $\Delta\theta$ is preferably not more than 200 arc-seconds" relates to the preferred embodiment of the invention and is not intended to limit the invention to angular offsets no greater than 200 arc-seconds. FIG. 8c illustrates an angular offset of about 25 degrees (scaled from the drawing) which is perhaps the largest angular offset one might want to use in an embodiment of the invention.

DRIFT MECHANISMS

(Asymmetric Damping)

The damping of the vibration pattern arises from such mechanical sources as internal damping within the fused quartz resonator material, residual surface stresses remaining after resonator finishing operations, and damping arising at the bond region between the resonator and its metal coating. The resonator damping is only approximately uniform. Its variation in the circumferential direction gives rise to two distinct damping time constants. As in the case of mass variation, it is the fourth harmonic of the damping distribution that determines the location of the "normal" axes of damping and differences of their time constants (Compare FIG. 4 where the added lumps may be thought of as regions of added damping.). These normal axes of damping do not generally coincide with the resonator's normal mass/stiffness mode axes and, in any case, the quadrature control loop (FIG. 10e and 10f) continually adjusts the voltage on the discrete forcer electrodes so that the normal mode axes, including the electrical springs, coincide at each instant with the antinodal axes of the vibration pattern.

Figure 9:
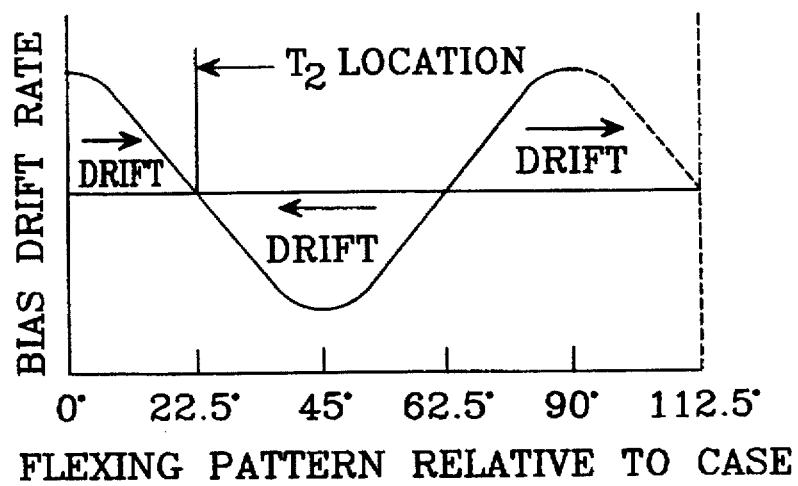
FIG. 9 is a graph illustrating case oriented drift due to asymmetric damping of the sensor of FIG. 1.

Asymmetric damping is one of the principal sources of drift in the HRG. In general, the vibration pattern antinodal axes do not coincide with either normal damping axis set, and the vibration pattern must be considered in terms of its components along the two normal damping axis sets. The amplitudes of these components decay at different rates. If T1 and T2 are the normal time constants, 1/T1 and 1/T2 are the normal component decay rates. The energy lost to damping is replenished by the ring forcer electrode as described above. The rate of energy replenishment is independent of the location of the vibration pattern antinodes. If T1 is the smaller time constant, because the T1 component is losing energy at a greater rate than the T2 component, the energy ultimately all ends up in the T2 component, which is the resonator's "preferred" (least damping) vibration pattern. The result is that the vibration pattern drifts toward its preferred location at a rate proportional to 1/T1−1/T2 and proportional to the sine of four times the difference angle between the existing pattern and its preferred location. The resulting housing-oriented drift is shown in FIG. 9.

RESIDUAL QUADRATURE-VIBRATION DRIFT

In the discussion of the quadrature control loop, it was assumed that the loop succeeded in reducing the quadrature vibration at the nodes of the main pattern to zero. In practice, a small residual quadrature vibration remains. This quadrature residual is the other principal drift source of the HRG.

The quadrature control loop suppresses quadrature by directing dc voltages to selected discrete forcer electrodes 22 to control the direction of the normal mode axes. It causes the normal mode axes to be aligned with the existing vibration pattern, but does not cause the normal mode frequencies to be equal. As a result, the vibration pattern and the reference phase generator oscillate at the one normal mode frequency while the residual nodal quadrature vibration oscillates at the other.

Quadrature is, however, defined in terms of demodulation with respect to the reference phase generator. Since the residual nodal quadrature is at a different frequency than the reference phase generator, it is interpreted as having a growing in-phase component, assuming that initially its phase was in quadrature with the reference phase generator signal. This growing in-phase component at the nodal location is, in effect, a rotation of the vibration pattern. The resultant drift rate is proportional to the product of the residual quadrature amplitude, the difference of the "natural" normal mode frequencies (that is, not including the electrical contributions), and the cosine of four times the angle between the existing vibration and the "natural" normal mode location.

RESIDUAL QUADRATURE-VIBRATION DRIFT; NONLINEAR CONTRIBUTION

The elastic spring force that restores the deformed resonator to its relaxed spherical shape is inherently nonlinear. The normal mode analysis described thus far is an analysis of linearized equations and applies to situations in which the vibration amplitudes are so small that nonlinear terms may be neglected. Under the conditions of operation of the HRG, the nonlinear terms are small, but not negligible. Their effect in perturbing the linear solutions must be taken into account.

To a first approximation, the nonlinearity makes the residual nodal quadrature vibration appear to have a higher natural frequency than the natural frequency of the main pattern. This effect is over and above any of the effects (four-fold symmetric mass variations and electric fields) discussed thus far. It gives rise to a drift by the same mechanism discussed in the last subsection. The major difference is that, since the effective spring for the nodal quadrature vibration appears always to be at the pattern node, the resultant drift magnitude is independent of pattern location; that is, it is a fixed bias drift. Its magnitude is proportional to the residual nodal quadrature vibration amplitude and to the square of the peak amplitude ($W_{pk}$) of the main pattern.

OPEN LOOP QUADRATURE-VIBRATION DRIFT COMPENSATION

In the closed loop quadrature vibration control, dc voltages are placed on selected discrete forcer electrodes 22 so as to develop an electrical spring component along the axis set 22.5 degrees from the pattern antinodal axis set. This electrical spring component is adjusted by the loop so as to cause the normal mode axes to be aligned with the vibration pattern. The drift sensitivity to residual quadrature vibration arises because the resulting normal mode frequencies are not equal. The normal mode frequencies may be made equal and the drift sensitivity to residual quadrature vibration reduced to zero by applying additional negative electrical spring components as a function of pattern angle as indicated by the first two terms of equations (4) and (5).

In practice, the required electrical spring component is determined in a calibration run by inserting a known amount of quadrature vibration and measuring the additional drift that results as a function of vibration pattern location. In this way, the electrical spring component required to match the normal mode frequencies is determined, including both the linear and the nonlinear influences. When this electrical spring component is included, the drift sensitivity to quadrature motion is reduced to near zero. This desensitization to quadrature error greatly reduces what would otherwise be the principal cause of drift variability.

Numerous variations and alternate embodiments will occur to those skilled in the art. Such variations and alternate embodiments are contemplated, and can be made without departing from the spirit and scope of the appended claims.

I claim:

1. A rotation sensor comprising:
   a resonator capable of sustaining a flexural standing wave pattern symmetrically distributed about a polar axis;
   a plurality of forcer electrodes positioned to initiate and maintain a flexural standing wave pattern in the resonator;
   a plurality of non-capacitive transducers positioned adjacent to the resonator to characterize the flexural standing wave pattern, each transducer being positioned adjacent to a different area on the resonator and generating a transducer signal that varies as a function of the distance between the transducer and its respective resonator area, at least one pair of the transducers having an angular separation selected from the value ranges (1) greater than 0 degrees and less than 25 degrees, (2) greater than 155 degrees and less than 180 degrees, and (3) greater than 180 and less than 205 degrees;
   a controller connected to drive the plurality of forcer electrodes with voltages derived from the transducer signals.

2. The sensor of claim 1 wherein the controller includes a force-to-rebalance control circuit for generating voltages to be applied to the forcer electrodes for the purpose of maintaining a nodal line of the standing wave pattern fixed with respect to the resonator.

3. The sensor of claim 2 wherein the force-to-rebalance control circuit is configured to dither a nodal or an antinodal line between each of the transducers in the at least one pair of transducers for the purpose of obtaining a scale factor calibration value.

4. The sensor of claim 2 wherein a nodal line of the standing wave pattern lies between the two transducers comprising the at least one pair of transducers, the controller utilizing the signals from the two transducers comprising the at least one pair of transducers to obtain a measure of the acceleration of the sensor in a direction parallel to the nodal line.

5. The sensor of claim 1 wherein the angular separation of the at least one pair of transducers is greater than 0 and less than 25 degrees.

6. The sensor of claim 1 wherein the angular separation of the at least one pair of transducers is greater than 155 degrees and less than 180 degrees or greater than 180 degrees and less than 205 degrees.

7. The sensor of claim 1 wherein one of the transducers in the at least one pair of transducers lies along a nodal or antinodal line of said standing wave pattern at any given time.

8. The sensor of claim 1 wherein the average position of a nodal or antinodal line of said standing wave pattern is half-way between the two transducers comprising the at least one pair of transducers.

* * * * *